Patented Jan. 2, 1945

2,366,326

UNITED STATES PATENT OFFICE 2,366,326

POLYMERIZATION OF BUTADIENE-1,3

Charles F. Fryling, Silver Lake, Ohio, assignor to The B. F. Goodrich Company, New York, N. Y., a corporation of New York No Drawing. Application November 2, 1940, Serial No. 364,101

14 Claims. (Cl. 260—84.5)

This invention relates to the polymerization of butadienes-1,3, and particularly to a method whereby butadienes-1,3 may be polymerized in an aqueous emulsion to form products closely resembling natural crude rubber.

The emulsion polymerization of butadienes-1,3 either alone or in admixture with other conjugated dienes or other materials copolymerizable therewith to form compositions of matter more or less resembling rubber is well known. It has been commonly observed, however, that the products of such polymerization often resemble vulcanized rubber rather than natural crude rubber in respect to solubility, plasticity, and processing characteristics. Thus, it has often been found that the polymers were insoluble in, and in some cases, not even swelled by benzene or acetone, and that they were tough, non-plastic materials which either would not homogenize on a mill or which were very difficult to mill and subject to other ordinary processing operations for natural rubber.

I have now discovered a class of materials which modifies the emulsion polymerization of butadienes-1,3 in such a manner that polymers more nearly resembling natural crude rubber may be produced than when the polymerization is carried on in the absence of the materials of this invention. This class of materials, which I have termed "modifiers," consists of nitrodiaryl polysulfides, by which is meant diaryl polysulfides containing a nitro substituent on at least one of the aromatic nuclei. The preferred class of materials consists of compounds having the structural formula

$$NO_2-R_1-S_x-R_2-NO_2$$

wherein $R_1$ and $R_2$ are arylene groups and $X$ is a small integer greater than 1. Included in this class of materials are such compounds as di-o-nitrophenyl disulfide, di-m-nitrophenyl disulfide, di-p-nitrophenyl disulfide, di-p-nitrophenyl trisulfide, di-p-nitrophenyl tetrasulfide, di(4-nitro-alpha-naphthyl) disulfide, di(2-nitro-p-tolyl) disulfide, p-nitrophenyl 2-nitro-p-tolyl disulfide, and p-nitrophenyl o-nitrophenyl disulfide. Diaryl polysulfides containing but a single nitro substituent such as p-nitrophenyl phenyl disulfide, p-nitrophenyl tolyl disulfide, etc., and even compounds containing more than two nitro substituents are also included in the broad scope of the invention, although the di-p-nitroaryl disulfides are at present the preferred materials.

The invention may be better understood from the following specific examples which are to be regarded as merely illustrating preferred embodiments and not as limiting the invention in any respect.

Example I—7.5 gm. of butadiene and 2.5 gm. of acrylonitrile were sealed in a glass polymerization tube with 25 cc. of a 2% aqueous solution of palmitic acid which had been 85% neutralized with sodium hydroxide, 1 cc. of hydrogen peroxide, and 0.058 g. of di-p-nitrophenyl disulfide, and polymerized by agitating the contents of the tube at 30° C. The copolymer appeared either to dissolve completely or swell infinitely in benzene, and to be coherent on a mill. A similar copolymer prepared in the absence of the di-p-nitrophenyl disulfide was insoluble in and only slightly swelled by benzene, and had a tendency to crumble on the mill rather than to form a coherent mass. It was also found that when the copolymer prepared in the presence of di-p-nitrophenyl disulfide was vulcanized according to a standard test recipe, the vulcanizate had an ultimate tensile strength of 5650 lbs./in.$^2$ and an elongation at break of 570%, while the vulcanized copolymer prepared in the absence of any modifier possessed an ultimate tensile strength of 4550 lbs./in.$^2$ and an elongation at break of 510%.

Example II—7.5 gm. of butadiene and 2.5 gm. of acrylonitrile were sealed in a glass polymerization tube with 25 cc. of a 2% aqueous solution of myristic acid which had been 85% neutralized with sodium hydroxide, 1 cc. of hydrogen peroxide, and 0.04 gm. of di-p-nitrophenyl disulfide, and polymerized by agitating the contents of the tube at 30° C. The copolymer was a plastic, coherent material which was 57% soluble in benzene and could be easily milled, while repetition of the experiment with the omission of the di-p-nitrophenyl disulfide yielded a non-coherent, non-plastic copolymer which was only 5% soluble in benzene and could be milled only with difficulty. The ultimate tensile strength and elongation at break of the vulcanized modified copolymer averaged 5300 lbs./in.$^2$ and 620% respectively, while the corresponding values for the vulcanized unmodified copolymer were 3700 lbs./in.$^2$ and 360%.

Example III—When di-o-nitrophenyl disulfide was substituted for the di-p-nitrophenyl disulfide in Example II, a very plastic copolymer was produced which was 20% soluble in benzene and formed a vulcanizate having an ultimate tensile strength averaging 5300 lbs./in.$^2$ and an elongation at break averaging 740 lbs./in.$^2$ While the above examples are confined to the use of di-nitrophenyl disulfides as the modifiers, it will be clear to those skilled in the art that other nitrodiaryl disulfides such as di(3-nitro-beta-naphthyl) disulfide, di-p-nitrophenyl tetrasulfide, etc. may similarly be employed. The proportion in which the modifier is included in the composition depends somewhat upon the properties desired in the copolymer, the higher proportions of modifier in general producing softer, more soluble polymers. Very small amounts of modifier such as 0.1% based on the monomer or even less may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of the polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber by sulfur change the properties of the crude rubber. This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion of a nitrodiaryl disulfide in emulsion polymerization batches produces the beneficial results hereinbefore described.

The modifying agents of this invention may be employed in emulsion polymerizations of butadienes-1,3 such as butadiene-1,3 itself (commonly called butadiene) as well as 2,3-dimethylbutadiene, isoprene, 2-chlorobutadiene, and piperylene, either alone or in admixture with each other or with comonomers polymerizable therewith such as styrene, acrylonitrile, methyl methacrylate, vinyl acetate, vinylidene chloride, methyl vinyl ketone, methyl vinyl ether, and other polymerizable hydrocarbons, nitriles, esters, ketones, and ethers. These comonomers are preferably, though not necessarily employed in minor proportions.

The polymerization of the above materials in aqueous emulsion may be effected by various catalysts such as per-compounds including hydrogen peroxide, ammonium persulfate, potassium persulfate, and other peroxides, persulfates, perborates, percarbonates, and the like, diazoaminobenzene, and dipotassium diazomethane disulfonate. Since the modifying agents of this invention have an inhibiting action, it may be desirable to include an activator for the catalyst in the emulsion, particularly when large amounts of modifying agent are employed. When hydrogen peroxide is being employed as the catalyst, for instance, compounds which may form complexes with the hydrogen peroxide such as sodium pyrophosphate, sodium oxalate, potassium fluoride, urea, glycine, alanine, and the like may be employed to activate the catalyst and produce a desirable type of polymer in a shorter period of time.

Any of the ordinary emulsifying agents such as fatty acid soaps, hymolal sulfates or sulfonates, alkylated aromatic salts of high molecular weight, organic bases, etc. may be employed to effect the emulsion of the monomers in the water. When the modifiers of this invention are employed in high proportions, the consequent inhibition of the rate of polymerization may be counter-balanced by employing emulsifying agents which are at the same time polymerization catalysts, such as fatty acid soaps, and by using somewhat higher proportions than are necessary to form good emulsions.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing an aqueous emulsion of a polymerizable butadiene-1,3 in the presence of a nitrodiaryl polysulfide.

2. The method which comprises polymerizing an aqueous emulsion of a polymerizable butadiene-1,3 in the presence of a nitrodiaryl disulfide.

3. The method which comprises polymerizing an aqueous emulsion of a polymerizable butadiene-1,3 in the presence of a compound having the structural formula $$NO_2-R_1-S_x-R_2-NO_2$$

wherein $R_1$ and $R_2$ are arylene groups and $X$ is a small integer greater than 1.

4. The method which comprises polymerizing an aqueous emulsion of a polymerizable butadiene-1,3 in the presence of di-p-nitrophenyl disulfide.

5. The method which comprises polymerizing an aqueous emulsion of butadiene-1,3 in the presence of a nitrodiaryl polysulfide.

6. The method which comprises polymerizing an aqueous emulsion of butadiene-1,3 in the presence of a compound having the structural formula $$NO_2-R_1-S_x-R_2-NO_2$$

wherein $R_1$ and $R_2$ are arylene groups and $X$ is a small integer greater than 1.

7. The method which comprises polymerizing an aqueous emulsion of a mixture of butadiene-1,3 and a minor proportion of acrylonitrile in the presence of a compound having the structural formula $$NO_2-R_1-S_x-R_2-NO_2$$

wherein $R_1$ and $R_2$ are arylene groups.

8. The method which comprises polymerizing an aqueous emulsion of butadiene-1,3 in the presence of a compound having the structural formula $$NO_2-R_1-S_x-R_2-NO_2$$

wherein $R_1$ and $R_2$ are phenylene groups and $X$ is a small integer greater than 1.

9. The method which comprises polymerizing an aqueous emulsion of a mixture of butadiene-1,3 and a minor proportion of acrylonitrile in the presence of di-p-nitrophenyl disulfide.

10. A composition of matter prepared by the method of claim 1.

11. A composition of matter prepared by the method of claim 3.

12. A composition of matter prepared by the method of claim 7.

13. A composition of matter prepared by the method of claim 8.

14. A composition of matter prepared by the method of claim 9.

CHARLES F. FRYLING.